Figure 1:
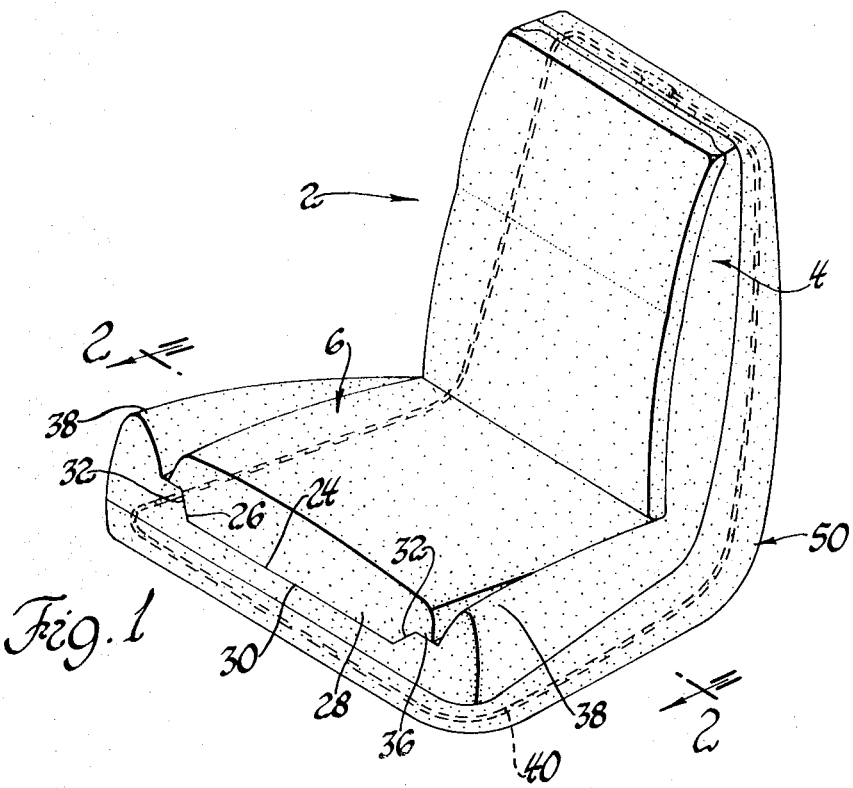

United States Patent

[11] 3,612,607

| [72] | Inventor | Thomas E. Lohr<br>Warren, Mich. |
|---|---|---|
| [21] | Appl. No. | 843,054 |
| [22] | Filed | July 18, 1969 |
| [45] | Patented | Oct. 12, 1971 |
| [73] | Assignee | Allied Chemicals Corporation<br>New York, N.Y. |

[54] PLASTIC FOAM SEAT CONSTRUCTION
7 Claims, 2 Drawing Figs.

[52] U.S. Cl............................................. 297/452,
297/445, 297/DIG. 1
[51] Int. Cl.............................................. A47c 7/02,
A47c 1/12
[50] Field of Search............................................ 297/452,
DIG. 1, DIG. 2, 455, 456; 5/345

[56] References Cited
UNITED STATES PATENTS

| 2,343,505 | 3/1944 | Gedris | 297/452 |
| 2,892,489 | 6/1959 | Hurley | 297/DIG. 1 |
| 2,980,167 | 4/1961 | Harris et al. | 297/452 UX |
| 3,154,345 | 10/1964 | Lambrecht | 297/452 X |
| 3,175,863 | 3/1965 | Hood | 297/DIG. 2 |
| 3,205,515 | 9/1965 | Unger | 297/452 X |
| 3,283,345 | 11/1966 | Berck | 297/452 X |
| 3,319,274 | 5/1967 | Upton | 5/345 |
| 3,329,466 | 7/1967 | Getz et al. | 297/452 X |

*Primary Examiner*—Paul R. Gilliam
*Attorneys*—Marvin Bressler and Jonathan Plaut ABSTRACT: A vehicle seat made up of a supporting slab of relatively hard, high density elastomeric urethane foam and a cushion mounted on said supporting slab of relatively soft, low density elastomeric urethane foam that is softer and more compressible than the material of the supporting slab, with interlocking means between the cushion and slab for preventing relative sliding movement between the cushion and slab. The cushion and slab are detachably secured together against separation by a suitable pressure sensitive adhesive so that the cushion can be removed and replaced when damaged.

PATENTED OCT 12 1971 3,612,607

INVENTOR.
Thomas E. Lohr
BY
Barnard, McGlynn & Reising
ATTORNEYS

PLASTIC FOAM SEAT CONSTRUCTION

This invention relates generally to the construction of seats particularly suitable for automobiles, and is particularly concerned with seats made up of plastic foams.

In the manufacture of seats made up of a composite of plastic foams such as shown, for example, in Harris et al. U.S. Pat. No. 2,980,167 of Apr. 18, 1961, a pad of relatively soft urethane foam is bonded to and supported by a pad of relatively hard urethane form to attempt to eliminate the necessity for coil springs and the like. It is not infrequent that the soft cushion normally engaged by the occupant of the seat is damaged and in need of replacement or repair. With the soft cushion bonded to, or formed integral with the hard supporting pad, it is necessary to replace the entire assembly when the cushion is damaged to the extent that replacement is necessary.

An object of this invention is to provide a seat made up of plastic foam material having portions of different densities and resistances to compression including a cushion portion that can be removed from the assembly and replaced when necessary without the necessity of removing and replacing the remaining plastic foam portions.

The foregoing, and other objects, are achieved by the provision of a seat including a supporting slab of relatively hard plastic foam with a relatively soft, compressible plastic foam cushion mounted on the slab with interlocking means formed between the cushion and slab to prevent relative sliding movement between the cushion and slab, and means for detachably securing the cushion to the slab against separation.

The slab material is of relatively high density elastomeric urethane foam and the cushion material is of relatively low density elastomeric urethane foam that is softer and more compressible than the material of the slab. The cushion is formed with a plurality of projections which extend into complementary recesses formed in the supporting slab to interlock the cushion and slab against relative sliding movement, and an adhesive detachably secures the cushion and slab against separation, the adhesive being of the pressure sensitive type or the type that remains tacky and permits forceable separation of the surfaces joined by the adhesive.

Figure 2:
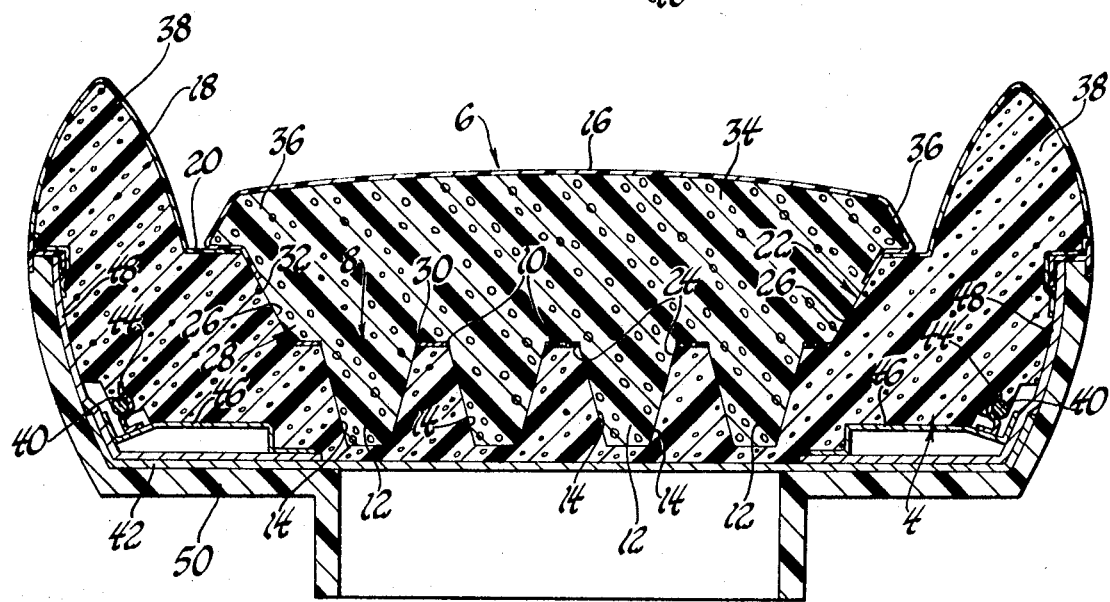

Other objects, advantages and features of the invention will become apparent from the following description taken in connection with the accompanying drawings, in which:

FIG. 1 is a perspective view of a vehicle seat embodying the present invention; and FIG. 2 is a sectional view taken on line 2—2 of FIG. 1.

In the drawings, reference numeral 2 collectively designates a seat for an automobile or similar vehicle, which seat includes a supporting slab 4 of relatively hard plastic foam with a relatively soft, compressible plastic foam cushion 6 mounted on slab 4, interlocking means designated generally by reference numeral 8 between the cushion and slab for preventing relative sliding movement between the cushion and slab, and means 10 detachably securing the cushion 6 to the slab 4 against separation.

Slab 4 comprises relatively high density self-skinning elastomeric urethane foam, the density of slab 4 being on the order of 5 to 8 pounds per cubic foot. Slab 4 may be compressible on the order of 25 percent; that is, the slab is compressible to approximately 75 percent of its unstressed height.

Cushion 6 comprises relatively low density elastomeric urethane foam that is softer and more compressible than the material of slab 4. For example, cushion 6 may have a density on the order of 1 1/2 to 3 pounds per cubic foot and may be compressible to approximately 50 percent of its unstressed thickness or height.

The interlocking means 8 includes projections 12 extending from cushion 6 which are interengageable with complementary recesses 14 formed in slab 4. The means 10 for detachably securing the cushion to the slab against separation may comprise a conventional pressure sensitive adhesive which is applied to at least a portion of the contacting surfaces of the cushion and slab.

The exposed surface of cushion 6 is formed with an integral, impervious urethane skin 16, and the exposed surface of slab 4 is formed with an integral urethane skin 18.

Slab 4 is formed with an outer surface 20 and with a cushion receiving cavity 22 communicating with the outer surface 20. Cavity 22 is formed with an inner surface 24 substantially parallel to the outer surface 20 of slab 4 and side surfaces 26 extending from the outer surface 20 to the periphery of the inner surface 24. Cushion 6 has a base portion 28 received in cavity 22 which is formed with an inner surface 30 and side surfaces 32 contacting the inner and side surfaces 24 and 26, respectively, of cavity 22.

As pointed out previously, the interlocking means 8 of the illustrated embodiment includes a plurality of projections 12 extending from the inner surface 30 of the base portion 28 of cushion 6 and an equal number of complementary recesses 14 formed in the slab which communicate with the inner surface 24 of cavity 22, each recess 14 receiving one of the projections 12. The adhesive 10 is applied between the inner surface 24 of the cavity and the inner surface 30 of the base portion 28. The illustrated projections 12 are frustoconical in configuration with the large diameter portion located adjacent the inner surface 30 of the base portion 28.

Cushion 6 includes an outer portion 34 projecting outwardly from the cavity 22 beyond the outer surface 20 of the slab 4, the outer portion 34 having edge portions 36 which overlie a portion of the outer surface 20 of the slab. As shown in FIG. 2, the slab 4 includes a pair of side bolsters 38 projecting from the outer surface 20 on each side of the cushion 6.

Seat 2, therefore, includes a supporting slab 4 of relatively hard, high density self-skinning elastomeric urethane foam with an outer surface 20, slab 4 being formed with a cushion receiving cavity 22 which communicates with the outer surface 20. The cavity has an inner surface 24 and side surfaces 26 extending between the inner surface 24 and outer surface 20, and at least one recess 14 in the slab communicates with the inner surface 24 of the cavity 22. The slab is formed with an integral, impervious urethane skin 18 and is formed with side bolsters 38 projecting outwardly from the outer surface of the slab on each side of the cavity 22.

The illustrated seat 2 further includes a supporting frame 42 of sheet metal or the like and a series of spring clips 44 welded or otherwise secured to the supporting frame members 46. For securing slab 4 to the supporting frame, a mounting rod 40 is molded into slab 4 adjacent the outer periphery of the slab opposite the outer surface 20, and the spring clips 44 penetrate and cut into the foam material of slab 4 to engage rod 40 and detachably secure the slab 4 to the supporting frame 42.

The supporting frame 42 in the illustrated embodiment includes side members 48 and an outer shell 50 or cover member of rigid urethane foam material covering the exposed surfaces of the supporting frame.

With the cushion 6 detachably secured to the supporting slab 4 by the pressure sensitive adhesive 10 and the interlocking means 8, the cushion can be removed from slab 4 and replaced when damaged without the necessity of having to remove and replace the supporting slab 4. In the illustrated embodiment, the seat 2 includes integral back and bottom portions, and, of course, the cushion can have integral back and bottom portions, or separate back and bottom portions for mounting on the supporting slab 4.

While a specific example of the invention has been illustrated and described in the foregoing specification and accompanying drawings, it should be understood that the invention is not limited to the exact construction shown. Various alternatives in the construction and arrangement of parts will become apparent to those skilled in the art without departing from the scope and spirit of the invention.

The embodiments of the invention in which an exclusive property or privilege is claimed are defined as follows:

1. A seat comprising:

a supporting slab of relatively high density plastic foam having frustoconical projections thereon forming frustoconical recesses therebetween;

a relatively soft, compressible plastic foam cushion, mounted on said slab, having frustoconical projections thereon forming frustoconical recesses therebetween, said frustoconical projections on said cushion interfitting with said frustoconical projections on said slab; and adhesive means detachably securing said cushion to said slab against separation.

2. A seat as claimed in claim 1 wherein said slab is formed with an outer surface having a cushion receiving cavity formed therein with an inner surface substantially parallel to said outer surface and side surfaces extending from said outer surface to the periphery of the inner surface, said cushion having a base portion received in said cavity with an inner surface and side surfaces contacting the inner and side surfaces, respectively, of said cavity.

3. A seat as claimed in claim 2 wherein said cushion includes an outer portion projecting outwardly from said cavity beyond the outer surface of said slab, said outer portion having edges overlying a portion of the outer surface of said slab.

4. A seat as claimed in claim 1 wherein said slab includes a pair of side bolsters projecting from the outer surface thereof on each side of said cushion.

5. A seat as claimed in claim 1 wherein said slab comprises a relatively high density elastomeric urethane foam, the exposed surface of said slab being formed with an integral impervious urethane skin; and said cushion comprises relatively low density elastomeric urethane foam that is softer and more compressible than the material of the slab, the exposed surface of said cushion being formed with an integral impervious urethane skin.

6. A seat as claimed in claim 2 wherein the larger diameter of the frustoconical projections are adjacent the inner surface of the base portion of said cushion.

7. A seat as claimed in claim 2 including:

a mounting rod mounted in said slab adjacent the outer periphery thereof opposite said outer surface;

a supporting frame member; and a series of spring clip members mounted on said supporting frame member and penetrating said slab to engage said mounting rod to detachably secure said slab to said supporting frame member.

PO-1050
(5/69)

UNITED STATES PATENT OFFICE
CERTIFICATE OF CORRECTION

Patent No. 3,612,607    Dated October 12, 1971

Inventor(s) THOMAS E. LOHR

It is certified that error appears in the above-identified patent and that said Letters Patent are hereby corrected as shown below:

Column 3, claim 4, line 1, "1" should be -- 2 --.

Signed and sealed this 16th day of May 1972.

(SEAL)
Attest:

EDWARD M. FLETCHER, JR.
Attesting Officer

ROBERT GOTTSCHALK
Commissioner of Patents